April 11, 1950 E. L. GINZTON ET AL 2,503,256
ULTRA HIGH FREQUENCY WAVE METER
Filed Jan. 29, 1943 4 Sheets-Sheet 1
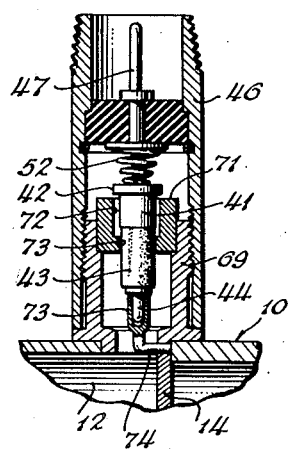
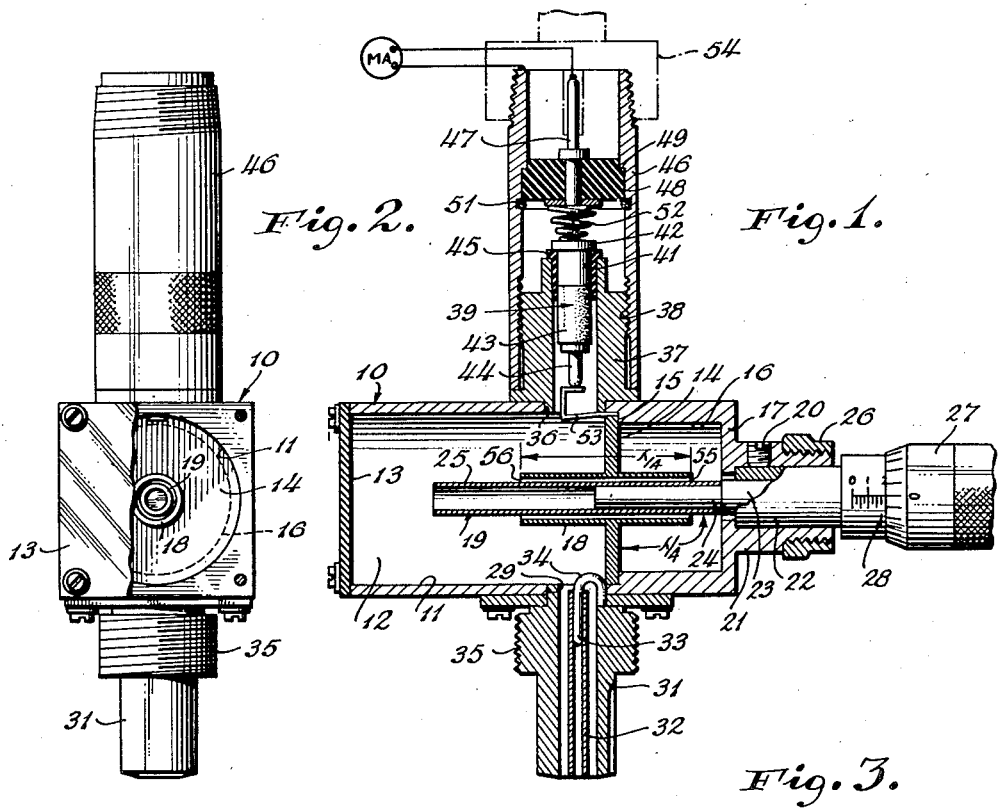
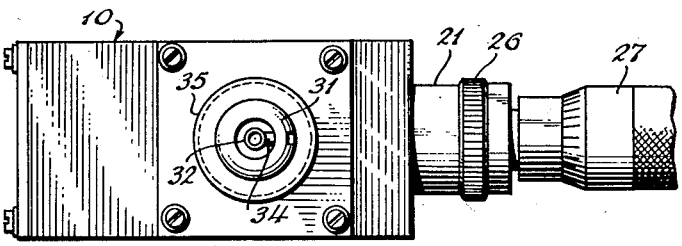
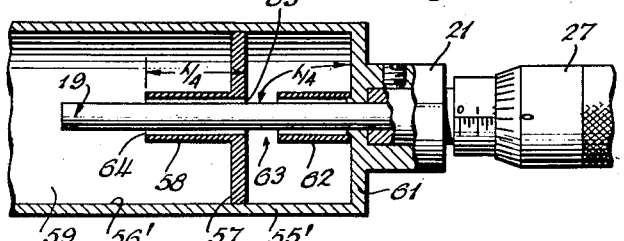
INVENTORS
E. L. GINZTON
F. L. SALISBURY
BY
ATTORNEY April 11, 1950 E. L. GINZTON ET AL 2,503,256
ULTRA HIGH FREQUENCY WAVE METER
Filed Jan. 29, 1943 4 Sheets-Sheet 2
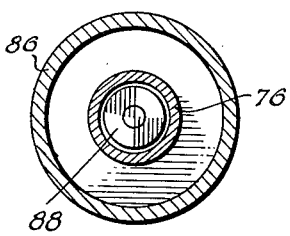
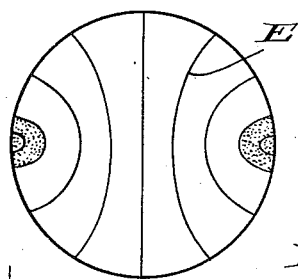
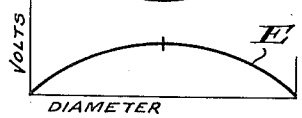
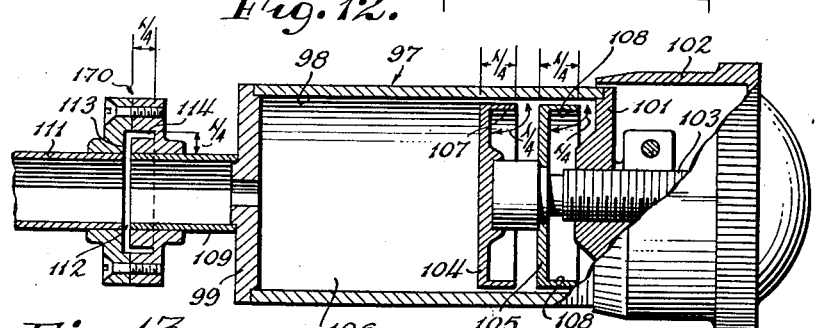
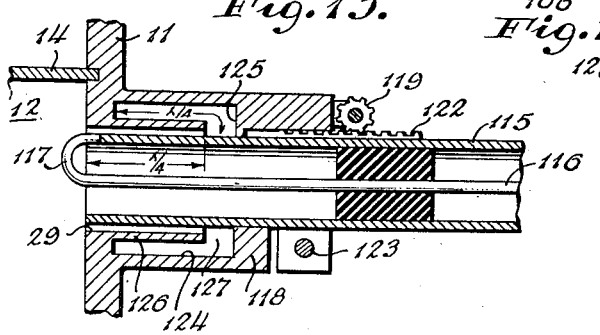
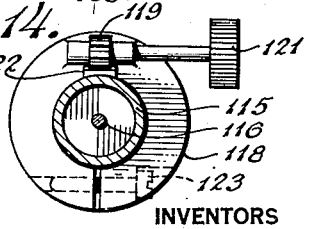
INVENTORS
E. L. GINZTON
BY F. L. SALISBURY
Paul B. Hunter
ATTORNEY

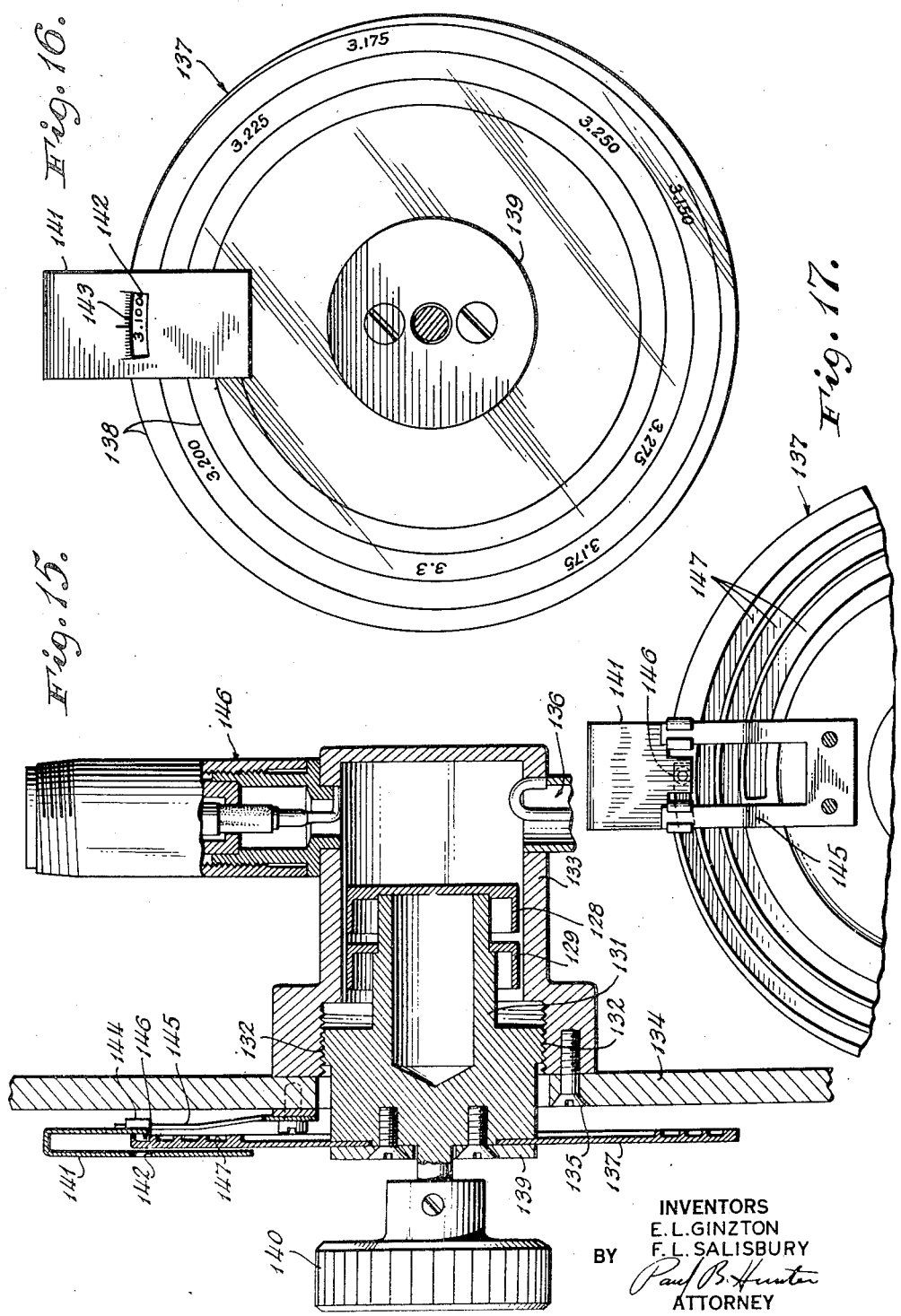

April 11, 1950  E. L. GINZTON ET AL  2,503,256
ULTRA HIGH FREQUENCY WAVE METER
Filed Jan. 29, 1943  4 Sheets-Sheet 4
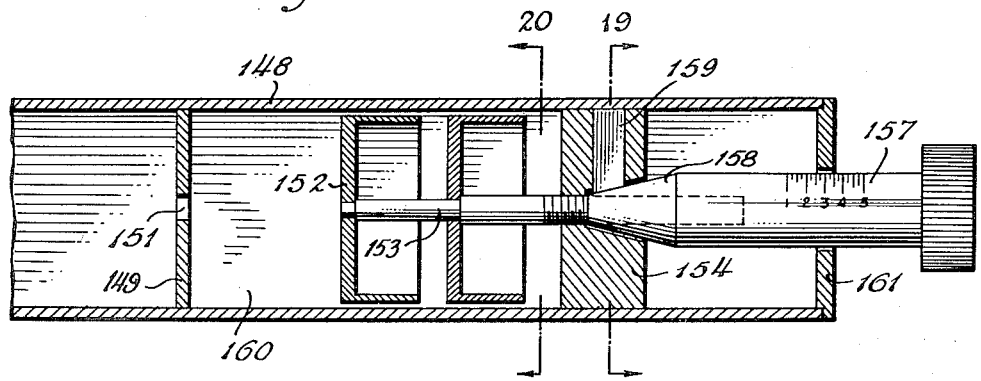
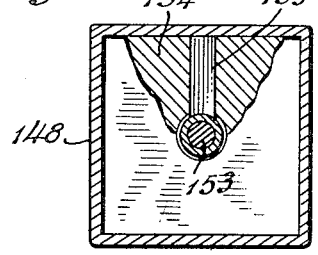 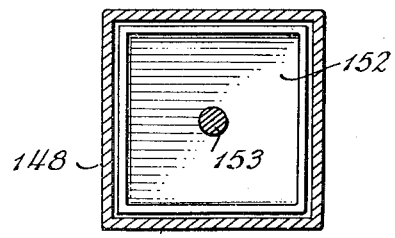
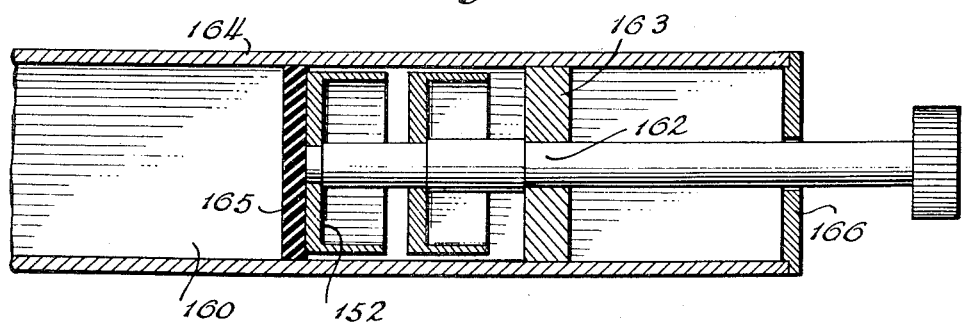
INVENTORS
E. L. GINZTON
F. L. SALISBURY
BY
ATTORNEY

Patented Apr. 11, 1950

2,503,256

UNITED STATES PATENT OFFICE 2,503,256

ULTRA HIGH FREQUENCY WAVEMETER

Edward L. Ginzton, Wantagh, and Frederick L. Salisbury, West Hempstead, N. Y., assignors to The Sperry Corporation, a corporation of Delaware Application January 29, 1943, Serial No. 474,016

2 Claims. (Cl. 178—44)

This invention relates to ultra high frequency electrical apparatus and more particularly to energy leakage prevention arrangements for use in wavemeters and the like having relatively adjustable surfaces enclosing or conducting ultra high frequency energy.

In its preferred embodiment, the invention will be described as incorporated in a wavemeter although certain principles may be extended to other devices as will appear. More specifically the invention contemplates the provision of wave trap arrangements for preventing leakage of ultra high frequency energy between relatively adjustable surfaces in wavemeters and other ultra high frequency apparatus.

For example, in wavemeters of the concentric line or cavity resonator type prior to the invention, coextensive surfaces of the adjustable plunger or piston and the adjacent surfaces of the meter have usually comprised such devices as ball bearings, spring fingers or the like seeking to maintain maximum physical contact between the surfaces in all positions of tuning adjustment. Such arrangements have not proved satisfactory for preventing leakage of ultra high frequency energy at the joint between the relatively adjustable surfaces, besides being stiff and difficult to uniformly adjust because of the high friction between the parts.

It is therefore a major object of this invention to provide ultra high frequency apparatus wherein novel arrangements are provided between relatively adjustable or like movable surfaces enclosing or conducting ultra high frequency energy, for preventing undesired leakage of energy through the joint between the surfaces. Preferably an impedance-transforming coupling of predetermined characteristics is provided between the surfaces.

A further object of the invention is to provide novel wavemeter construction wherein undesired leakage of ultra high frequency energy is prevented. The wavemeter may be of the concentric line type or the cavity resonator type, either type having relatively adjustable members defining a joint at which leakage is to be prevented.

A further object of the invention is to provide novel crystal detector arrangements in an ultra high frequency wavemeter.

Still a further object of the invention is to provide a novel wave trap construction between relatively axially adjustable parts of a coaxial type transmission line.

A further object of the invention is to provide novel scale arrangements for fine adjustment wavemeters.

It is a further object of the invention to provide novel wavemeter construction operable for substantially directly measuring wave length of radiation in wave guides.

A further object of the invention is to provide novel wave trap arrangements for preventing leakage of ultra high frequency energy through the joint or joints between two relatively adjustable surfaces in a wavemeter or the like.

Further objects of the invention will appear as the description proceeds in connection with the appended claims and the annexed drawings wherein:

Fig. 1 is an elevation, partly in section, of a concentric line type wavemeter embodying the invention;

Fig. 2 is an end elevation, partly broken away to show the interior, looking from left to right in Fig. 1;

Fig. 3 is a bottom plan view of the wavemeter of Fig. 1;

Fig. 4 is a partly sectional view illustrating a further embodiment of a concentric line type wavemeter of different internal construction;

Fig. 5 is a fragmentary sectional elevation illustrating an alternate output connection and crystal detector mounting which may be used with Fig. 1 or in any of the forms of the invention;

Fig. 6 is a side view, partly in section, of a wavemeter of the cavity resonator type designed to operate in a selected mode and utilizing the principles of the invention;

Fig. 7 is a section along line 7—7 of Fig. 6;

Figs. 8, 9, 10 and 11 are diagrammatic views illustrating the electrical and magnetic field distributions according to a preferred mode of oscillation of the wavemeter of Fig. 6;

Fig. 12 is a side view, partly in section, illustrating a wavemeter operating similar to Fig. 7 but of slightly different construction;

Fig. 13 illustrates the invention as applied to a coaxial line adjustment assembly;

Fig. 14 is an end elevation of the apparatus of Fig. 13.

Fig. 15 is a plan view, partly in section, of a further embodiment of the invention embodying a wide range meter having a special scale assembly;

Fig. 16 is a front elevation of the meter of Fig. 15;

Fig. 17 is a fragmentary end view of the rear face of the scale plate of Fig. 15;

Fig. 18 is a sectional view illustrating the invention as embodying an adjustable piston slidable in a continuation of a rectangular wave guide.

Figs. 19 and 20 are sections along lines 19—19 and 20—20 of Fig. 18; and

Fig. 21 is a sectional view illustrating the principles of the invention as applied to an adjustable wave guide plug.

Referring to Fig. 1, a metal wavemeter body 10 of any desired external shape is formed with an internal cylindrical bore 11 enclosing a chamber 12 bounded at opposite ends by a removable flat wall 13 and a metal partition 14 parallel to wall 13, and both wall 13 and partition 14 are perpendicular to the axis of bore 11.

Partition 14 is rigidly fixed in an internal shoulder 15 in the resonator body and, beyond partition 14, body 10 is formed with a reduced cylindrical bore 16 which extends to an integral end wall 17 parallel to wall 13. Thus, partition 14 separates a pair of right cylindrical chambers, and the relative diameters of these chambers are not material to the invention.

Partition 14, which may be integral with body 10 if desired, is centrally apertured and formed with an integral hollow sleeve 18 which in Fig. 1 projects into both chambers, although the exact extent to which it projects into either chamber is not critical as will appear later in discussing the critical factors related to the meter dimensions.

A cylindrical rod 19, which may comprise an extension of a micrometer plunger as illustrated, extends coaxially through sleeve 18 and projects therebeyond into chamber 12. The outer surface of rod 19 is exactly parallel to but spaced a predetermined small distance from the interior surface of sleeve 18 over their coextensive length, so that rod 19 and sleeve 18 define an impedance-transforming coupling between the relatively movable parts of the wavemeter, as will be explained. Wall 17 is formed with an apertured hollow boss 21 in which is non-rotatably secured, as by setscrew 20, a micrometer barrel 22 rotatably carrying the micrometer spindle 23. Spindle 23 is formed with a reduced portion 24 on which is snugly frictionally fitted a hollow tube 25 extending through sleeve 18. If desired, rod 19 may be a continuous solid or hollow member rigid or integral with spindle 23. The externally threaded end of boss 21 is provided with a nut 26 for panel fitting purposes.

The usual rotatable micrometer handle 27 is mounted on barrel 22, and the barrel and handle are marked with the usual micrometer scales 28. Desired axial displacement of plunger rod 19 within chamber 12 is effected by rotation of handle 27 in either direction, and the amount of this displacement is indicated by scales 28. Since such micrometer construction is well known, further description of this part is not necessary.

An aperture 29 is formed in the wall of bore 11 adjacent partition 14 for rigidly mounting a hollow pipe fitting 31 carrying a coaxial hollow sleeve 32 adapted to telescope with the outwardly projecting terminal 33 of a stiff wire loop 34 disposed at least partly within chamber 12. Fitting 31, 32 and wire 33, 34 comprise a concentric line and antenna coupling for introducing the ultra high frequency energy, the wavelength of which is to be measured, into chamber 12 of the wavemeter. Any equivalent transmission line such as a wave guide may be employed for the same purpose. Fitting 31 is suitably threaded at 35 for attachment to an input transmission line.

Bore 11 is formed at another region adjacent partition 14 with an aperture 36 in which is rigidly seated tubular metal pipe fitting 37 externally threaded at 38. Fitting 37 is formed with a cylindrical bore into which extends a crystal detector cartridge 39. Cartridge 39 externally comprises a metal base 41 having an enlarged head 42, a porcelain or like insulator body 43 and a metal terminal 44. A sensitive crystal, of silicon or the like, is mounted in solid contact within base 41, and a cat's whisker wire connected at one end to terminal 44 has its other end in contact with a sensitive portion of the crystal, the crystal and wire being held immovable by imbedding insulator material. This cartridge per se is of known construction, so that further description is not necessary.

Cartridge 39 is frictionally fitted into a supporting annular insulating sleeve 45 which electrically insulates the cartridge from fitting 37, and which serves as the dielectric of a by-pass condenser arrangement for the alternating component of the rectified current. This prevents leakage of high frequency energy past the cartridge.

An externally knurled metal tube 46 is threadedly connected at 38 to fitting 37. Tube 46 carries a conductor terminal 47 fixed in an insulator block 48 which is held against axial displacement in the tube, as by shoulder 49 and a snap ring and groove 51. A spring 52 is compressed between the enlarged inner end of terminal 47 and cartridge head 42, when tube 46 is drawn up tight.

A suitable spring finger 53 anchored at one end to partition 14 serves for coupling the interior of chamber 12 to terminal 44. Thus finger 53, terminal 44, the wire and crystal within cartridge 39, base 41, head 42, spring 52 and terminal 47 comprise one conductor of the output line, of which tube 46 is the other conductor. A suitable coupling 54 is provided for leading the output to a milliammeter or other indicator as indicated.

In operation, the ultra high frequency energy to be measured is introduced by the input line and loop 34 into chamber 12, where standing waves are set up. To determine the frequency of these standing waves, we axially adjust plunger rod 19 through manipulation of rotatable handle 27 until the indicator connected to the output line shows a maximum reading. This occurs only when the chamber 12 is of such dimensions as to be resonant at the input frequency. From the micrometer reading at resonance, the wavelength of the input energy may be calculated if the meter has been previously calibrated. If desired, the scales 28 may read directly in wavelength or frequency.

Referring now to Figure 1, the distance from point 55 to partition 14, as measured through the space between sleeve 18 and bore 16, is preferably chosen as substantially electrically equivalent to one-quarter of the average resonant wavelength in the range for which the wavemeter is designed. For example, the particular wavemeter shown in Figure 1 has a measurement range of 8.5 to 12.5 centimeter wavelengths which means it may be adjusted to produce resonance in chamber 12 at any wavelength in that range. A good choice for the working quarter wavelength distance would therefore be one-quarter of the average 10.5 centimeter wavelength.

Again, the wave meter shown in Figure 15 has a range of only 3.1 to 3.4 centimeters. The quarter wave distance which can be selected for the capacitative coupling in such a small range meter will of course lie in a smaller range than the larger range meter of Figure 1, but in both meters the available range is sufficiently small that the small differences in quarter wavelength of the frequencies in the operative range may be considered negligible as a practical matter.

It will be understood, however, that this preferable working quarter wavelength distance is not essentially critical within practical considerations. The wavemeter has a relatively small range, as above explained, and this working distance could just as well be equal substantially to one-quarter of any of the resonant wavelengths within the wavemeter operative range without appreciable differences in practical results. Hence, therefore, there is relatively wide latitude in the choice of the absolute value of this distance and we will refer herein to this working distance as substantially a quarter wavelength of a frequency within the operative range of the wavemeter, and we intend to embrace any substantially equivalent distance equivalently effective for the purpose below explained over the wavemeter range.

Thus, from point 55 to partition 14 we have a substantially quarter wave line short-circuited at one end, so that the impedance at point 55 looking toward partition 14 is very high, nearly infinite. We also choose the length of sleeve 18 to be equal substantially to a quarter wavelength of a frequency in the operative range of the wavemeter. Since the impedance at point 55 is very high, the impedance at point 56 looking toward point 55 at the other end of that quarter wave line section is transformed to a very low value. This arrangement provides the equivalent of a direct electrical short circuit between sleeve 18 and rod 19 at point 56, so that sleeve 18 and rod 19, although relatively movable, are electrically interconnected more efficiently than by the best known possible friction joint. This efficient electrical connection is, moreover, mechanically frictionless, so that adjustment of plunger 19 is rendered smooth and even.

We have thus provided an effective half wavelength trap continuously effective for blocking escape of energy from chamber 12 regardless of the position of adjustment of rod 19. The coextensive length of sleeve 18 and rod 19, and the electrical distance between point 55 and partition 14 remain unchanged during all adjustments of rod 19 in the wavemeter range.

The wavemeter of Figure 4 differs over that of Figure 1 chiefly in the wave trap construction. The wavemeter body 55' encloses a cylindrical bore 56' separated into two chambers by a partition 57. A cylindrical sleeve 58, integral with partition 57, extends into the resonant chamber 59 in closely spaced relation to axially adjustable rod 19. End wall 61 mounts the above-described micrometer structure, as well as a rigid sleeve 62 coaxial with rod 19 extending toward partition 57. Sleeve 62 terminates short of partition 57 to provide a gap indicated at 63.

The distance electrically between point 65 and wall 61, and the length of sleeve 58, are each chosen as substantially one-quarter wavelength of a frequency within the operative range of the wavemeter, as in Figure 1. Thus, looking to the right in Figure 4, point 65 is of nearly infinite impedance and substantially zero current, so that point 64, coupled thereto by a quarter-wave transmission line, has very low impedance.

Thus we provide an effective half wavelength wave trap between point 64 and wall 61 which prevents appreciable escape of energy from chamber 59.

The wavemeter of Figure 4 operates similarly to that of Figure 1, and the two embodiments demonstrate that gap 63 may be located anywhere between partition 57 and wall 61, provided of course the wave trap characteristics are maintained.

Figure 5 illustrates an optional form of detector cartridge mounting which may be used in Figure 1 if desired. Tube 46 is threaded to a pipe fitting 69 which is the same as fitting 37 except for the cartridge mount. An annular metal collar 71 having a bore 72 larger than cartridge base 41, and a smaller bore 73 snugly fitting porcelain body 43 is rigid or integral with fitting 69. A relatively stiff wire 74 is fixed at one end to the wavemeter body wall and bent at right angles to coaxially enter fitting 69, within which it ends in an enlarged head 75 telescoping terminal 44.

Wire 74 is sufficiently rigid to prevent the cartridge from being advanced by spring 52 beyond the position illustrated in Figure 5, whereby the metal cartridge base 41 is maintained spaced from the partly coextensive bore 72 and defines therewith a by-pass condenser arrangement similar to Figure 1. An advantage of this structure is that insulator sleeve 45 of Figure 1 is unnecessary, the air space between bore 72 and base 41 serving as the dielectric of the condenser.

Figure 6 illustrates a cavity resonator type wavemeter embodying the principles of the invention. Wavemeters similar to those shown in Figs. 6 and 12 are claimed in application Serial No. 102,276, filed June 30, 1949, a division of the present application. A tubular body member 76 having a cylindrical bore 77 is closed at one end by an integral wall 78 and at the other end by a removable wall 79 secured as by screws 81 to the member 76. A spindle 82 is formed with a section 83 rotatably mounted by means of a relatively fine thread connection in wall 79. A micrometer-type barrel 84 is fixed to the outer end of spindle 82 and carries a scale 85. A stationary micrometer-type barrel 86 having a scale 87 cooperating with scale 85 is rigid with body member 76.

A piston member 88, effectively comprising one end wall of the resonant chamber 80 otherwise defined by bore 77 and wall 78, is mounted on the inner end of spindle 82. The piston is formed with a thin rearwardly extending side wall 89 parallel to but spaced from the coextensive portions of bore 77 and spindle 82.

The length of wall 89 coextensive with bore 77 is substantially a quarter wavelength of a frequency in the operative range of the wavemeter, and the distance between point 92 and the rear surface of piston 88 is electrically equal to a similar quarter wavelength, as shown, so that here also we have provided a half wavelength wave trap at the piston. The impedance at point 91 is very low according to the explanation above in connection with Figure 1, so that the coupling represents an effective electrical short circuit between the piston and bore.

Piston 93 is preferably a duplicate of piston 88 and has a side wall 94 also substantially one-quarter wavelength in length which forms a wave trap functioning similarly to that at piston 88 for blocking escape of any high frequency energy which might pass beyond piston 88.

In operation, chamber 80 is excited by introduction of ultra high frequency energy to be measured thereinto, as by the rectangular wave guide 95 and communicating aperture 96 in wall 78. Preferably, where chamber 80 is cylindrical, the exciting energy is so introduced with the electrical lines of force oriented as in Figure 6 so as to set up an oscillating field having generally the mode shown in Figures 8-11. In this mode, the electrical field represented by lines E is strongest adjacent the axis of chamber 80, while the magnetic field represented by the lines B is strongest adjacent the chamber side wall. The graphs of Figures 9 and 11 represent the electric and magnetic field distributions E and B in the illustrated cross sections.

As barrel 84 is revolved, piston 88 is displaced along the axis of bore 77 to change the dimensions of chamber 80 until chamber 80 is of such size as to resonate at the frequency of the input energy. The condition of resonance is detected as by an output line like that in Figure 1. Scales 85 and 87 may be read and related to a suitable calibration chart, or may be graduated to read directly in terms of wavelength. The wave traps at pistons 88 and 93 maintain their operational characteristics during all positions of adjustment of the pistons and therefore function to prevent energy leakage from chamber 80 in normal wavemeter operation.

The output line for detecting the resonant condition within chamber 80 may be the same as shown in Figures 1 or 5.

The wavemeter illustrated in Figure 12 is very similar to that of Figure 6 but is of larger dimensions and measurement range. Body 97, which also serves as the stationary micrometer barrel, has a cylindrical bore 98 closed at opposite ends by walls 99 and 101. Rotatable barrel 102 is secured to the outer end of a spindle 103 rotatably mounted by a relatively coarse thread in wall 101. Pistons 104 and 105, which are shaped to define half-wavelength wave traps preventing unwanted escape of energy from cylindrical resonant chamber 106, are dimensioned similarly to the piston in Figure 6. Walls 107 and 108 are thus each substantially equal in length to a quarter wavelength in the resonant range of chamber 106.

Chamber 106 is much larger than chamber 80 in Figure 6 and measures longer wavelength energy over a somewhat larger range. The wavemeter of Figure 12 has an output detector line similar to that in Figures 1 or 5 and otherwise operates similarly to Figure 6.

Figure 12 also illustrates a stationary wave trap in the coupling 170 between input wave guide sections 109 and 111. Sections 109 and 111 have coupling flanges rigid therewith and secured together rigidly so as to slightly space their opposite ends as at point 112. Internally, coupling 110 is formed with a passage 113 open at one end at point 112 and at its other end to a blind passage 114. Each of passages 113 and 114 is of a length substantially equal to one-quarter of the resonant wavelength of the energy normally carried by the wave guide, as indicated. The wave trap defined by passages 113 and 114 prevents energy leakage from the wave guide.

Figures 13 and 14 illustrate the invention as applied to an adjustable concentric line coupling which may be employed as at aperture 29 in Figure 1 as shown, or as the input line for the wavemeter of Figures 6 or 12. Outer conductor 115 carries a coaxial inner conductor 116 formed into antenna loop 117 within the chamber 12. Conductor 116 is axially slidably but non-rotatably mounted in a bearing support provided by boss 118 integral with body 11. Boss 118 carries a pinion 119 adjustable by knob 121 and cooperating with a rack 122 on conductor 115 for axially shifting the conductor. This axial adjustment may be locked at any point as by a screw 123 cooperating with a split section of boss 118 as illustrated.

Boss 118 is internally formed with an enlarged cylindrical bore 124 terminating in a wall 125. A thin cylindrical sleeve 126 rigid with body 11 projects outwardly in coaxial spaced relation to conductor 115, but terminates at a gap 127 short of wall 125. As indicated in Figure 13, the length of sleeve 126 coextensive with conductor 115 is substantially a quarter-wavelength of a frequency within the operative range of the meter or other device with which it is employed, and the distance from gap 127 to body 11 through the space between bore 124 and sleeve 126 is also electrically substantially equal to a similar quarter-wavelength, thus providing a half wave trap effective during all conditions of adjustment of loop 117 for varying input coupling with chamber 12. The adjustable assemblage of Figure 13 therefore operates similarly to that of Figures 1, 6 and 12.

Figures 15–17 illustrate a further form of the cavity resonator type wavemeter having a relatively fine adjustment over its range. Here pistons 128 and 129 similar to pistons 104 and 105 are secured upon a spindle 131 having a threaded connection at 132 to a body 133 which is fixed to a panel 134 as by screws 135. The output line at 46 is the same as in Figure 5, while the input line is a conventional coaxial line and loop antenna 136.

A scale disc 137 has a spiral scale 138 marked, for example, thereon in the range of 3.100 to 3.400 centimeter wavelengths. Such an effectively long scale enables us to employ relatively fine threads at 132 which increases the accuracy of the meter. Disc 137 is removably mounted on spindle 131, as by the releasable clamp ring 139, so that different scale range discs may be substituted. The disc and spindle are rotated as a unit by knob 140.

An index plate 141 having a window 142 and vernier markings 143 is mounted as at 144 for sliding movement radially of disc 137 along a support 145 fixed to panel 134. Plate 141 is formed with a projection 146 arranged to track within a spiral groove 147 on the back of disc 137 coextensive with scale 138. As knob 140 is rotated for changing the dimensions of the resonant chamber, window 142, which is of such size as to frame the working section of the scale, is continually radially positioned to follow the scale. This scale arrangement permits relatively fine adjustment in a wavemeter, which otherwise is constructed and operates similarly to the wavemeters in Figures 6 or 12.

Figures 18–20 illustrate the invention as applied to a wave guide terminal which may serve as part of a wavemeter.

A rectangular wave guide 148 which is supplied with energy as adjacent its other end (not shown) has a partition 149 formed with an aperture 151. Beyond aperture 151, rectangular pistons 152 are mounted on a shaft 153 rigid with a rectangular block 154 slidably fitted within guide 148, the whole constituting a slidable piston assembly. The piston assembly, as illustrated, is provided with the same impedance-transforming coupling with guide 148 as explained above in connection with Figures 6 and 12.

Shaft 153 extends fixedly through block 154 into threaded engagement with a rotatable wedge handle 157 which has a conical face 158 disposed within a similarly shaped depression in block 154. A locking key 159 is mounted for radial sliding movement in a suitable aperture in block 154 and has an inclined face adapted to contact face 158. When handle 157 is rotated in one direction, it advances along shaft 153 toward block 154 so that face 158 wedges key 159 outwardly against the inner surface of guide 148 to thereby lock the whole piston assembly against axial sliding along guide 148. When handle 157 is rotated to loosen key 159, the entire piston assembly may be slidably displaced along guide 148.

When used as a wavemeter, the piston assembly may be measurably displaced along guide 148 and a suitable indicator employed to detect the positions of maximum voltage, whereby the distance between wave crests in the chamber 160 may be measured. Scale and index means for measuring the actual displacement of the piston assembly may be provided on handle 157 and wall 161. When not used as a wavemeter, the piston assembly may function as a wave guide plug similarly to that in Figure 21. Referring to Figure 21, the piston assembly 152 is shown mounted on a shaft 162 fixed to a slidable block 163 within the open end of a hollow wave guide 164. The front end of the piston assembly is supported on a dielectric slide guide block 165. Shaft 162 extends slidably through rigid end wall 166 so that the piston assembly may be axially displaced as in Figure 18. In Figure 21, the piston assembly functions as simply as a wave guide plug, as for matching impedances or otherwise adjustably terminating a wave guide.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an ultra high frequency wavemeter, an effective concentric line section comprising outer and inner conductors relatively adjustable axially for tuning, means for loosely coupling an energy source to said line section, said concentric line section being a passive resonator characterized by very high Q, a conductive coupling between said conductors at one region, and a sleeve carried by said outer conductor and surrounding said inner conductor in spaced relation thereto at another region, said sleeve and conductive coupling forming an impedance-transforming half-wave section for preventing high frequency leakage.

2. A wavemeter for very high frequency energy, comprising a hollow conductive housing transversely partitioned by a conductive diaphragm to form first and second cylindrical cavities each having appreciable volume, said cavities having a common axis, a tubular conductive sleeve fixedly positioned in said diaphragm coaxially with said axis, the outside diameter of said sleeve being appreciably smaller than the inside diameters in said first and second cavities, a conductive member having a cylindrical outer surface extending axially through said second cavity, onward through said sleeve and beyond the end of said sleeve in said first cavity and part way through said first cavity to end therein and to form a high Q coaxial-line resonator in said first cavity, the outside diameter of said conductive member being slightly smaller than the inside diameter of said sleeve for high capacitance therebetween, the axial extent of the adjacent surfaces of said sleeve and said conductive member being a quarter-wavelength transmission line of low characteristic impedance at a frequency substantially equal to the frequency of resonance of said resonator, said conductive member and sleeve and the inner cylindrical wall in said second cavity cooperating as a resonator presenting a high impedance at the end of said quarter-wavelength transmission line, coupling means for admitting very high frequency energy to said first cavity resonator, and means extending external of said housing for adjusting the projection of said conductive member within said first cavity resonator to adjust the response frequency thereof.

EDWARD L. GINZTON.
FREDERICK L. SALISBURY.

REFERENCES CITED

The following references are of record in the file of this patent:

UNITED STATES PATENTS

| Number | Name | Date |
| --- | --- | --- |
| 1,750,032 | Timtiman | Mar. 11, 1930 |
| 2,102,805 | O'Donovan | Dec. 21, 1937 |
| 2,106,713 | Bowen | Feb. 1, 1938 |
| 2,106,771 | Southworth | Feb. 1, 1938 |
| 2,190,668 | Llewellyn | Feb. 20, 1940 |
| 2,203,806 | Wolf | June 11, 1940 |
| 2,218,923 | Newhouse | Oct. 22, 1940 |
| 2,226,479 | Pupp | Dec. 24, 1940 |
| 2,235,521 | Higgins | Mar. 18, 1941 |
| 2,322,971 | Roosenstein | June 29, 1943 |
| 2,323,201 | Carter | June 29, 1943 |
| 2,342,254 | Dallenbach | Feb. 22, 1944 |
| 2,349,440 | Lavoie | May 23, 1944 |
| 2,351,895 | Allerding | June 20, 1944 |
| 2,364,526 | Hansell | Dec. 5, 1944 |
| 2,400,777 | Okress | May 21, 1946 |
| 2,401,344 | Espley | June 4, 1946 |
| 2,404,086 | Okress | July 16, 1946 |
| 2,404,542 | Sloan | July 23, 1946 |
| 2,415,962 | Okress | Feb. 18, 1947 |

OTHER REFERENCES

Ser. No. 384,019, Dallenbach (A. P. C.), published May 18, 1943.